2,868,745

VINYL CHLORIDE RESIN STABILIZED WITH THREE COMPONENT STABILIZER

Chrysosthenis M. Canarios, East Cleveland, Ohio, assignor to The Harshaw Chemical Company, Cleveland, Ohio, a corporation of Ohio No Drawing. Application January 16, 1957
Serial No. 634,429

2 Claims. (Cl. 260—23)

This invention relates to resin stabilizers and to stabilized resinous compositions of matter wherein the resins are of the polyvinyl chloride type.

As is well known, vinyl chloride resins decompose upon prolonged exposure to heat and light. This is objectionable in most cases and especially where the color and clarity of the product are important factors. The decomposition is especially pronounced where scrap portions of the resins are recycled and reprocessed in extrusion and other forming and processing apparatus operated at elevated temperatures.

It is an object of the invention to provide for novel compositions which exhibit a stabilizing effect on polyvinyl chloride resins.

It is another object to provide for novel compositions of matter composed of two or more ingredients which exhibit a heat stabilizing effect on polyvinyl chloride resins.

Another object is to provide for polyvinyl chloride containing compositions of matter which exhibit stability to decomposition through the action of heat and/or light.

Another object is to provide for new polyvinyl chloride compositions of matter containing ingredients which coact to exhibit a clarifying and heat stabilizing effect.

According to the invention stabilizers comprising metallic soaps and 3,6-endomethylene-delta-4-tetrahydrophthalic anhydride have been found especially suitable for imparting clarity and heat stability to polyvinyl chloride resins. The stabilizers are employed in amounts ranging from about 0.5 to about 10 parts by weight of the polyvinyl chloride resin. The use of the anhydride as a stabilizer component has also been found to be beneficial in improving the physical properties of extruded and molded polyvinyl chloride resins.

Esters of 3,6-endomethylene-delta-4-tetrahydrophthalic anhydride have been employed in the past as plasticizers for vinylidene and polyvinyl chloride type resins, and it has been suggested that they exhibit a stabilizing action with respect to the resins. I have found that the anhydride per se imparts no heat stability to polyvinyl chloride resins, although when employed with metallic soaps such as those conventionally employed as stabilizers for vinyl chloride resins, the anhydride and metallic soaps coact to impart a greater stability to heat than the metallic soaps alone. This is surprising in view of the fact that the anhydride alone exhibits none of these properties. Not only does the anhydride impart increased stability to decomposition in the sense that it permits the subjection of the resinous materials to longer periods of elevated temperature processing prior to complete decomposition as evidenced by considerable carbon precipitation throughout the resin, but the anhydride tends to impart greater clarity to the vinyl chloride resinous material than secured from the use of the metallic soaps alone. Additionally, I have found that the anhydride also imparts greater stability to polyvinyl resins stabilized with metallic soaps and containing additionally an antioxidizing agent such as 4,4'-thiobis-(6-tert-butyl-m-cresol) which also serves as a stabilizing ingredient.

It is contemplated that metallic soaps conventionally employed for stabilizing polyvinyl chloride resins may be used according to the invention, and, in general, it is contemplated that metallic soaps of such heavy metals as tin, lead, zirconium, mercury, cadmium, zinc and magnesium and soaps of the alkaline earth metals such as barium, strontium and calcium may be employed. The acids from which the soaps are prepared may have from 6 to 20 carbon atoms. Suitable organic acids from which the soaps are prepared may be such saturated aliphatic acids as palmitic, stearic, 2-ethyl hexoic, and lauric as well as such unsatuarted aliphatic acids as linoleic, linolenic, oleic, ricinoleic, and cycloaliphatic acids as naphthenic, tall oil, rosin oil and rosin. Particularly, suitable metallic soaps which may be utilized according to the invention are barium and cadmium stearates and laurates. In general, the metallic soap comprises the major portion of the stabilizer.

The anhydride, specifically, 3,6-endomethylene-delta-4-tetrahydrophthalic anhydride, may be employed with one or more metallic soaps in amounts ranging from about 0.5 to about 30 percent by weight of the stabilizer. Preferred amounts range from about 2 to 15 percent by weight of the stabilizer.

Although the metallic soap-anhydride combination has been found to exhibit greater stability than the metallic soap alone, even greater heat stability has been found to exist when 4,4'-thiobis-(6-tert-butyl-m-cresol) is also employed in the stabilizer. In this respect the bis compound may be employed in amounts ranging from about 0.1 to about 10 percent by weight of the stabilizer, being employed in amounts preferably ranging from about 0.5 to about 6 percent by weight of the stabilizer.

The component of the stabilizer may be incorporated in the resin by a number of methods all of which are well known in the art. For example, the solid resin and stabilizing additives may be mixed together by means of hot rolls or other mixing apparatus adapted to mix solid resins. Suitable solvent solutions of the stabilizing agent may be incorporated in the resin as such, or a solution of the stabilizers may be mixed with a solution of the polyvinyl chloride. As in the incorporation of most stabilizers it is necessary that an intimate mixture and dispersion of the stabilizer and resin be accomplished to effectively stabilize all portions of the mixture.

The new polyvinyl chloride resinous compositions and the stabilizing action of the compositions of matter described herein will be more evident to those skilled in the art through consideration of the following examples:

Example 1

4.4 parts of a barium-cadmium soap containing a weight ratio of cadmium to barium (Cd/Ba) of 3/2 and prepared from a 10 percent by weight lauric acid containing mixture of lauric and stearic acids was mixed with 100 parts of polyvinyl chloride resin on a 2-roll mill operated at about 320° F. until thorough dispersement (about 10 minutes after banding) of the soap in the resin was accomplished. Thereafter, a plurality of identical samples of the stabilized material were subjected to aging conditions at 350° F., in an oven, individual samples being removed at 30-minute intervals to determine the effect of the aging conditions thereon.

An identical mixture was prepared as above except that there was also incorporated in the resin 0.5 part of 3,6-endomethylene-delta-4-tetrahydrophthalic anhydride. Samples of this stabilized resin were also subjected to the same aging conditions, samples being removed from the oven at 30-minute intervals.

It was found in the case where only the soap was employed as a stabilizer that after 150 minutes the resin was completely decomposed as evidenced by its black color and opaqueness. Samples removed prior to the 150-minute sample were progressively more discolored the longer they had been subjected to the aging condition. In the case where the anhydride was also present in the stabilizer the resin did not decompose to the same extent as the aforementioned 150-minute sample until about 180 minutes. All prior samples removed from the oven were considerably more transparent and clearer than any of the correspondingly treated samples which were prepared utilizing only the metallic soap as the stabilizer.

An attempt was also made to ascertain the stabilizing effect of 0.5 part of 3,6-endomethylene-delta-4-tetrahydrophthalic anhydride in 100 parts of polyvinyl chloride resin according to the method set forth above, it being observed, however, that the resin decomposed during the mixing operation on the 2-roll mill.

*Example 2*

4.4 parts of a barium-cadmium soap containing a ratio of cadmium to barium (Cd/Ba) of 3/2 and prepared from a 10 percent by weight lauric acid containing mixture of lauric and stearic acids was mixed with 0.1 part of 4,4'-thiobis-(6-tert-butyl-m-cresol) and 100 parts of polyvinyl chloride resin on a 2-roll mill operated at about 320° F. until thorough dispersement (about 10 minutes after banding) of all the ingredients in the resin was accomplished. Thereafter, a plurality of identical samples of the stabilized resinous material were subjected to aging conditions at 350° F., individual samples being removed at 30-minute intervals to determine the effect of the aging conditions thereon. The resinous material was found to be completely decomposed after 240 minutes under the aging conditions as evidenced by its opaqueness and black color. On the other hand, when an identical resinous mixture was prepared containing additionally 0.5 part of 3,6-endomethylene-delta-4-tetrahydrophthalic anhydride and similarly aged, the 240-minute sample was still transparent and each of the samples removed prior to the 240-minute sample was clearer and more transparent than corresponding samples similarly aged without the anhydride.

*Example 3*

1.9 parts of a barium-cadmium soap containing a ratio of cadmium to barium (Cd/Ba) of 3/2 and prepared from a 10 percent by weight lauric acid mixture of lauric and stearic acids, 0.1 part of 4,4'-thiobis-(6-tert-butyl-m-cresol), and 0.15 part of 3,6-endomethylene-delta-4-tetrahydrophthalic anhydride, together with 45 parts of dioctylphthalate and 2 parts of an epoxidized soy bean oil (plasticizers) were mixed with 100 parts of a polyvinyl chloride resin on a 2-roll mill operated at about 320° F. until thorough dispersement (about 10 minutes after banding) of all the ingredients in the resin was accomplished. Thereafter a plurality of samples of the stabilized resinous material were subjected to aging conditions in an oven at 350° F., samples of the resin being removed at 30-minute intervals to determine the effect of the aging conditions thereon. It was found that all samples removed from the oven were clearer and exhibited less decomposition than similarly prepared and correspondingly aged samples not containing 3,6-endomethylene-delta-4-tetrahydrophthalic anhydride as a component of the stabilizer.

In all the examples set forth herein the samples of the resinous material subjected to the aging condition were about 1/16 inch in thickness.

In the preparation of the resinous materials in the above examples it is contemplated that any of the metallic soaps heretofore mentioned may be substituted for the metallic soaps set forth therein.

3,6-endomethylene-delta-4-tetrahydrophthalic anhydride has the following formula:

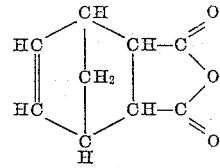

whereas 4,4'-thiobis-(6-tert-butyl-m-cresol) has the following formula:

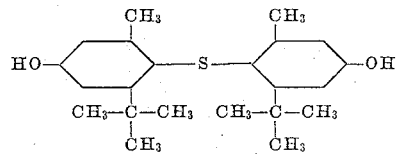

I claim:
1. A heat stable polyvinyl chloride resinous composition comprising vinyl chloride resin and from 0.5 to 10 parts of a stabilizer per 100 parts of resin, said stabilizer essentially consisting of from 0.5 to 30% of 3,6-endomethylene-delta-4-tetrahydrophthalic anhydride by weight, from 0.1 to 10% of 4,4'-thiobis-(6-tertiary-m-cresol) by weight, and the balance of the stabilizer being a metallic soap selected from metal salts of aliphatic and cyclo-aliphatic organic acids, the metal portion of said salts being selected from the group consisting of tin, lead, zirconium, mercury, cadmium, zinc, magnesium, barium, strontium and calcium, and the organic acid portion of said salts being selected from the group consisting of palmitic, stearic, 2-ethyl hexoic, lauric, linoleic, oleic, ricinoleic, naphthenic, tall oil, rosin oil and rosin acids.

2. The composition according to claim 1 where said stabilizer essentially consists of from 2 to 15% of 3,6-endomethylene-delta-4-tetrahydrophthalic anhydride by weight, from 0.1–10% of 4,4'-thiobis-(6-tertiary-butyl-m-cresol) by weight, and the balance of the stabilizer being a metallic soap selected from metal salts of aliphatic and cycloaliphatic organic acids as defined in said claim.

References Cited in the file of this patent
UNITED STATES PATENTS

| | | |
|---|---|---|
| 2,075,543 | Reed | Mar. 30, 1937 |
| 2,370,756 | Sibley | Mar. 6, 1945 |
| 2,394,417 | Yngve | Feb. 5, 1946 |
| 2,537,845 | Morris et al. | Jan. 9, 1951 |

OTHER REFERENCES

Monsanto Chem. and Plastics, 27 edition, p. 158 (1945), Div. 50. Copy in Scientific Library.